United States Patent
Nishizawa

(10) Patent No.: US 8,150,188 B2
(45) Date of Patent: Apr. 3, 2012

(54) IMAGING APPARATUS

(75) Inventor: Tsutomu Nishizawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 1083 days.

(21) Appl. No.: 12/007,755

(22) Filed: Jan. 15, 2008

(65) Prior Publication Data

US 2008/0181506 A1 Jul. 31, 2008

(30) Foreign Application Priority Data

Jan. 26, 2007 (JP) .................................. 2007-016751

(51) Int. Cl.
*G06K 9/40* (2006.01)

(52) U.S. Cl. ........ 382/254; 382/260; 382/274; 382/275; 358/3.26; 358/3.27; 358/463

(58) Field of Classification Search .................. 382/260, 382/274, 275; 358/3.26, 3.27, 463
See application file for complete search history.

(56) References Cited

U.S. PATENT DOCUMENTS

| | | | |
|---|---|---|---|
| 5,758,043 A * | 5/1998 | Takizawa et al. ............. 358/1.16 |
| 6,385,347 B1 * | 5/2002 | Matsuda ........................ 382/263 |
| 6,433,325 B1 * | 8/2002 | Trigg ........................... 250/201.3 |
| 6,611,627 B1 * | 8/2003 | LaRossa et al. ............... 382/240 |
| 6,628,842 B1 | 9/2003 | Nagao |
| 6,671,068 B1 | 12/2003 | Chang et al. |
| 6,740,883 B1 * | 5/2004 | Stodilka et al. .......... 250/363.04 |
| 7,157,726 B2 * | 1/2007 | Naruoka ................... 250/559.19 |
| 7,291,841 B2 * | 11/2007 | Nelson et al. ............. 250/370.09 |
| 2003/0137597 A1 | 7/2003 | Sakamoto et al. |
| 2004/0201717 A1 | 10/2004 | Matsushima |
| 2006/0028576 A1 | 2/2006 | Ito |
| 2006/0204054 A1 | 9/2006 | Steinberg et al. |

FOREIGN PATENT DOCUMENTS

| | | |
|---|---|---|
| JP | A-3-288831 | 12/1991 |
| JP | A-07-030780 | 1/1995 |
| JP | A-11-41512 | 2/1999 |
| JP | A-2002-051255 | 2/2002 |
| JP | A-2003-156680 | 5/2003 |
| JP | A-2003-21964 | 7/2003 |
| JP | A-2006-203339 | 8/2006 |

OTHER PUBLICATIONS

Digital Image NZ; "Digital Sharpening I;" Feb. 2004; XP-002479225.
Jun. 21, 2011 Office Action issued in corresponding Japanese Patent Application No. 2007-016751 (with translation).

* cited by examiner

*Primary Examiner* — Yosef Kassa
(74) *Attorney, Agent, or Firm* — Oliff & Berridge, PLC

(57) ABSTRACT

An imaging apparatus includes an imaging section, a subject extracting section, and an image processing section. The imaging section captures an object image and generates data of an image. The subject extracting section extracts a main subject from the image. The image processing section performs a noise addition process on the data of the image to add noise for an area where the main subject is positioned within the image.

16 Claims, 4 Drawing Sheets

IMAGING APPARATUS

CROSS-REFERENCE TO RELATED APPLICATION

This application is based upon and claims the benefit of priority from Japanese Patent Application No. 2007-016751, filed on Jan. 26, 2007, the entire contents of which are incorporated herein by reference.

BACKGROUND

1. Field

The present invention relates to an image processing in an imaging apparatus such as an electronic camera.

2. Description of the Related Art

Conventionally, a method in which an edge of an image is enhanced by an edge enhancement process is generally performed in an electronic camera as a method improving a sharpness of the image. For example, an example of the above-stated electronic camera is disclosed in Japanese Unexamined Patent Application Publication No. Hei 7-30780. Besides, as another method, it is attempted that noise is intentionally added to an image shot in an image processing on a computer, to improve the sharpness of a subject which is in focus.

However, when the noise is added to the image in the conventional way, it has been necessary to add the noise uniformly for a whole image, or to specify a place where the noise is to be added by a user. Accordingly, in a former case, there has been a problem in which the noise of the image increases up to a portion where the user does not intend to. On the other hand, in a latter case, it has been very complicated for the user because an operation in which the user specifies the subject in the image is necessary.

SUMMARY

The present invention is to solve the above-stated problems in the conventional art. An object is to provide a device capable of easily obtaining a preferable image of which sharpness of a main subject is high.

An imaging apparatus according to a first invention includes an imaging section, a subject extracting section, and an image processing section. The imaging section captures an object image and generates data of an image. The subject extracting section extracts a main subject from the image. The image processing section performs a noise addition process on the data of the image to add noise for an area where the main subject is positioned within the image.

An imaging apparatus according to a second invention includes an imaging section, a subject extracting section, and an image processing section. The imaging section captures an object image and generates data of an image. The subject extracting section extracts a main subject from the image. The image processing section performs a noise reduction process on the data of the image to reduce noise from the image, and enhances a degree of the reduction of the noise for an area where the main subject is not included within the image, compared to an area where the main subject is positioned.

In a third invention according to the first or the second invention, the imaging apparatus further includes a focus detecting section detecting a focusing state in a focus detecting area set inside a photographing screen. Besides, the subject extracting section extracts the main subject based on a position of the focus detecting area at a time of photographing.

In a fourth invention according to the first or the second invention, the subject extracting section recognizes a specific subject included in the image, and extracts the main subject based on the recognition result.

In a fifth invention according to the third or the fourth invention, the subject extracting section divides the image into plural areas, and selects the area where the main subject is positioned from among the plural areas.

In a sixth invention according to the first or the second invention, the image processing section adjusts, in accordance with an object-distance, the noise left in the image.

In a seventh invention according to the sixth invention, the imaging apparatus further includes a focus detecting section calculating a focus evaluation value of the object image, and searches for a lens position where the focus evaluation value becomes a maximum value. Besides, the image processing section obtains the object-distance based on an output of the focus detecting section.

In an eighth invention according to the first invention, the image processing section performs the noise addition process after an edge enhancement process is performed on the data of the image.

In a ninth invention according to the second invention, the image processing section performs an edge enhancement process after the noise reduction process is performed on the data of the image.

DETAILED DESCRIPTION OF THE EMBODIMENTS

Explanation of First Embodiment

Figure 1:
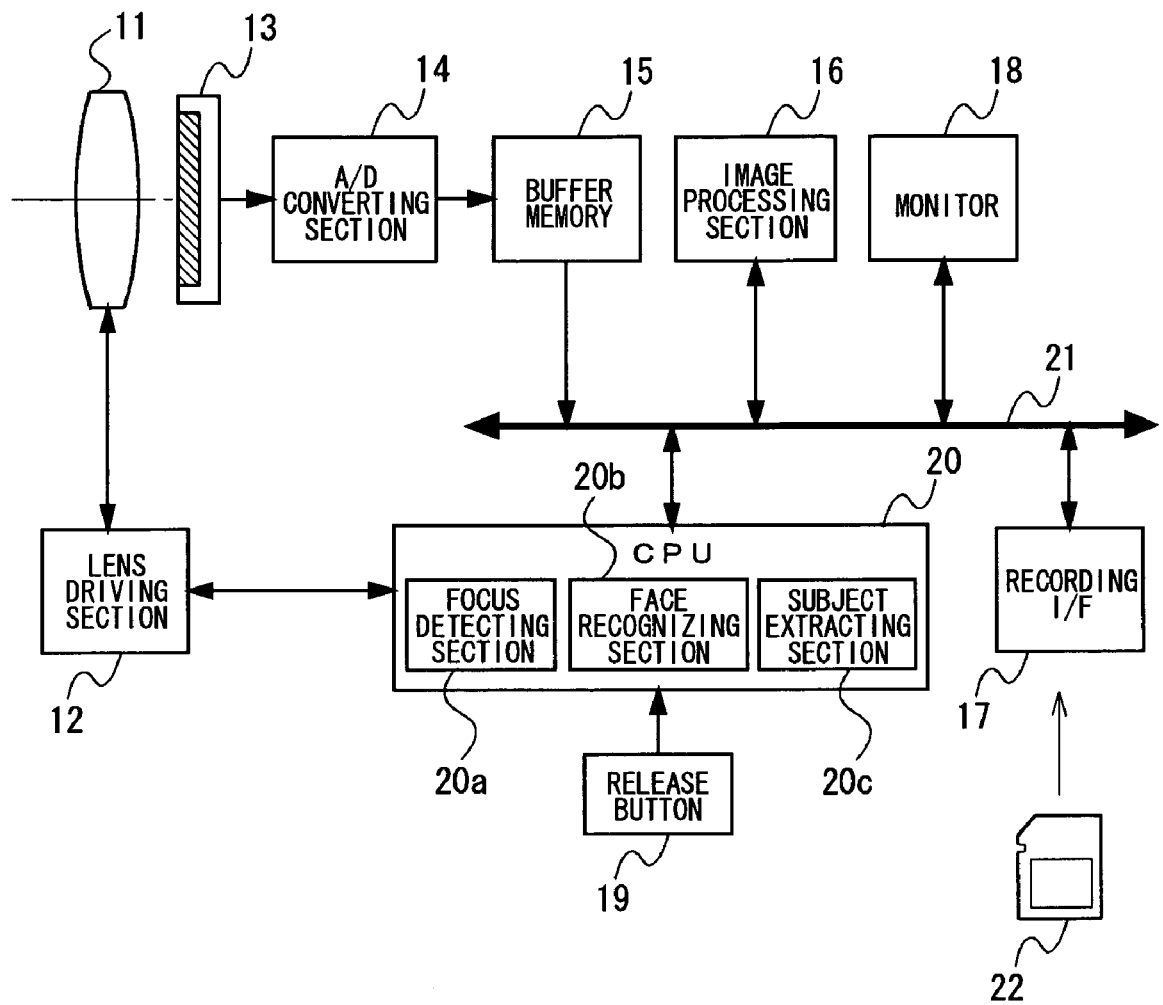
FIG. 1 is a block diagram explaining a configuration of an electronic camera of a first embodiment.

FIG. 1 is a block diagram explaining a configuration of an electronic camera of a first embodiment. The electronic camera has an imaging lens 11, a lens driving section 12, an image pickup device 13, an A/D converting section 14, a buffer memory 15, an image processing section 16, a recording I/F 17, a monitor 18, a release button 19, a CPU 20, and a bus 21. Here, the buffer memory 15, the image processing section 16, the recording I/F 17, the monitor 18, and the CPU 20 are respectively connected via the bus 21. Besides, the lens driving section 12 and the release button 19 are respectively connected to the CPU 20.

The imaging lens 11 is constituted of plural lens groups including a zoom lens and a focusing lens. A lens position of the imaging lens 11 is adjusted in an optical axis direction by the lens driving section 12. Besides, the lens driving section 12 outputs the lens position of the imaging lens 11 to the CPU 20 by an encoder (not-shown). Incidentally, the imaging lens 11 is shown as one lens in FIG. 1 for simplicity.

The image pickup device 13 is disposed at an image space side of the imaging lens 11. This image pickup device 13 performs a photoelectric conversion of an object image formed by a luminous flux passing through the imaging lens 11, to generate an analog image signal. Incidentally, an output of the image pickup device 13 is connected to the A/D converting section 14.

Here, the image pickup device 13 captures an image of a recoding image (main image) at a time of releasing. Besides, the image pickup device 13 captures an image of a through image by thinning-out reading by every predetermined interval also at a time of photographing standby (non-releasing time). The above-stated data of the through image is used for an image display on the monitor 18, various calculation processes by the CPU 20, and so on.

The A/D converting section 14 performs an A/D conversion of the image signal output from the image pickup device 13. An output of the A/D conversion section 14 is connected to the buffer memory 15. The buffer memory 15 temporarily records the data of the images in a preceding step or a subsequent step of the image processing in the image processing section 16.

The image processing section 16 performs various kinds of image processing (a color interpolation process, a gradation conversion process, an edge enhancement process, a white balance adjustment, and so on) on the data of the image for one frame. Besides, the image processing section 16 performs a noise addition process or a noise reduction process on the data of the main image based on an instruction of the CPU 20. Incidentally, the image processing section 16 is also responsible for a compression process and so on of the data of the main image.

A connector to connect a recording medium 22 is formed at the recording I/F 17. The recording I/F 17 performs a writing/reading of the data for the recording medium 22 connected to the connector. The above-stated recording medium 22 is constituted of a hard disk, a memory card housing a semiconductor memory, or the like. Incidentally, a memory card is shown in FIG. 1 as an example of the recording medium 22.

The monitor 18 displays various images in accordance with the instruction of the CPU 20. For example, a moving image of the through image is displayed on the monitor 18 at the time of photographing standby. Besides, it is possible to reproduce and display the main image on the monitor 18 after the photographing.

The release button 19 accepts from the user an instruction input to start an auto-focus (AF) operation before the photographing and an instruction input to start an exposure operation at the time of photographing.

The CPU 20 is a processor performing an overall control of the electronic camera. Besides, the CPU 20 functions as a focus detecting section 20a, a face recognizing section 20b, and a subject extracting section 20c by executing a program stored in a not-shown ROM.

The focus detecting section 20a performs an AF calculation by a contrast detection system based on the data of the through image. This focus detecting section 20a integrates an absolute value of a high-frequency component of the through image, and generates a focus evaluation value relating to a predetermined object image. Besides, the focus detecting section 20a compares the focus evaluation values of before and after a moving of the focusing lens, and searches for a lens position where the focus evaluation value becomes a maximum value (a focusing position). Incidentally, it is also possible for the focus detecting section 20a to calculate an object-distance from the lens position at the time of focusing.

The face recognizing section 20b performs a face recognizing process on the data of the image to detect a face area of a person from among a photographic screen. This face recognizing process is performed following a publicly known algorithm. As an example, the face recognizing section 20b extracts characteristic points such as respective end points of eyebrows, eyes, a nose and a lip from the image by a publicly known characteristic point extraction process, and determines whether it is the face area or not based on these characteristic points. Otherwise, the face recognizing section 20b obtains a correlation coefficient between the face image prepared in advance and an image being a determination object, and determines as the face area when this correlation coefficient exceeds a certain threshold value.

The subject extracting section 20c performs a subject extracting process extracting a main subject included in the image. Incidentally, the subject extracting section 20c divides the image into plural areas in the above-stated subject extracting process, and selects the area where the main subject is positioned from the divided area group.

Figure 2:
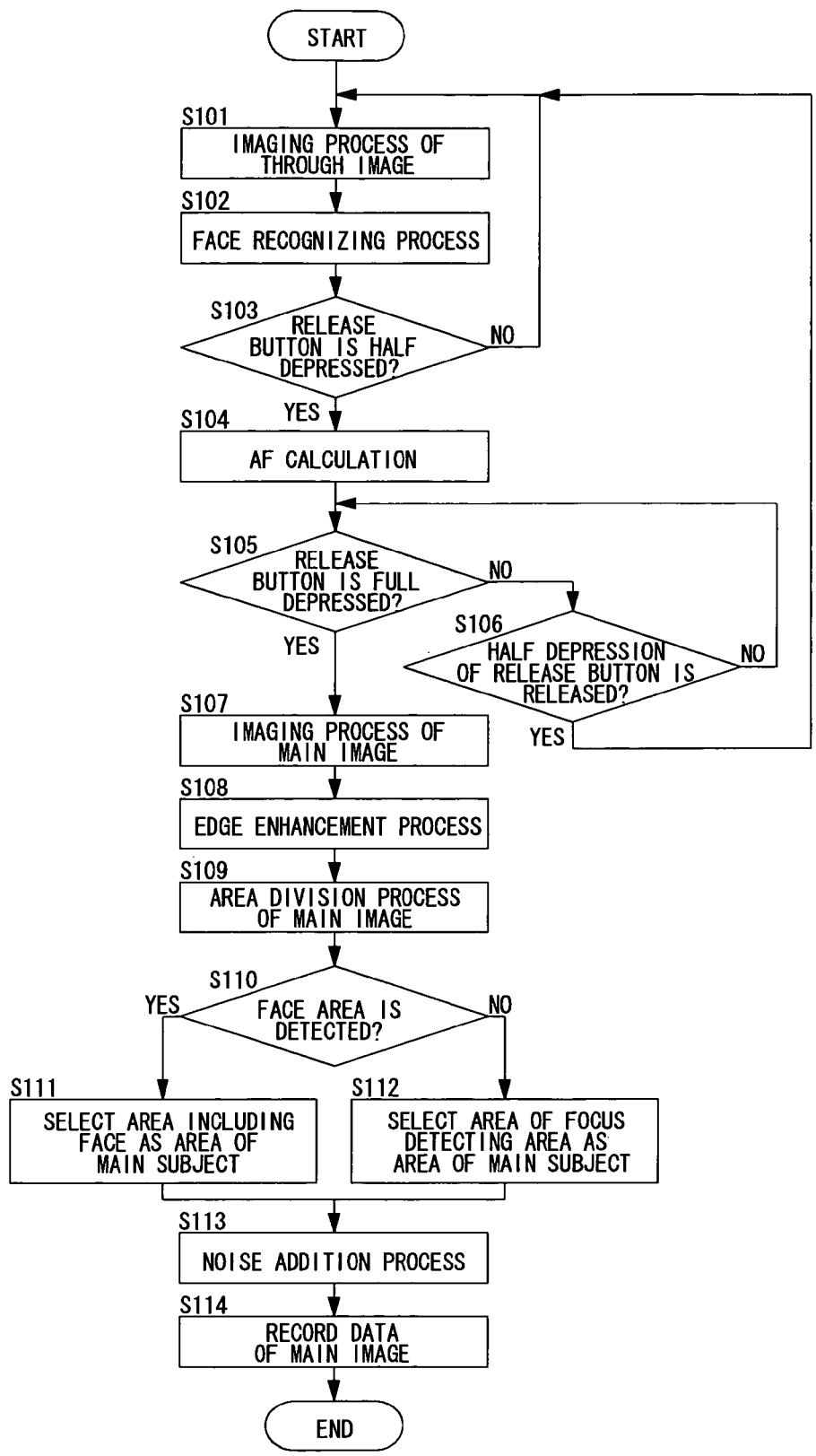
FIG. 2 is a flowchart explaining an example of photographing operations in the electronic camera of the first embodiment.

Hereinafter, an example of photographing operations in the electronic camera of the first embodiment is described with reference to a flowchart in FIG. 2. Incidentally, in FIG. 2, the description is made on an assumption being in a state in which a face recognizing function at the time of photographing is set to be turned on.

Step 101: When the user turns on a power of the electronic camera, the CPU 20 drives the image pickup device 13 to perform the imaging process of the through image. The image pickup device 13 captures an image of the through image with a predetermined frame rate. The CPU 20 performs an analysis of a scene based on the data of the through image. Besides, the CPU 20 instructs the image processing section 16 of the image processing of the through image, and displays the moving image of the through image on the monitor 18. Consequently, it is possible for the user to perform a framing of a subject by the through image displayed on the monitor 18.

Step 102: The face recognizing section 20b of the CPU 20 performs the face recognizing process on the data of the through image. The face recognizing section 20b generates face recognition information (a position, size, and so on of the face within the photographing screen) when the face area exists inside the photographing screen. Besides, when the face recognition information is generated, the focus detecting section 20a of the CPU 20 sets the focus detecting area at the position of the face of the person and performs the face recognition AF. Incidentally, when the faces of the persons are detected in plural, the focus detecting section 20a performs the face recognition AF focusing on the face area which is considered to have a largest area existing at a close side or the face area positioning at a center of the photographing screen.

Step 103: The CPU 20 determines whether the release button 19 is half-depressed or not. When the release button 19 is half-depressed (YES side), the CPU 20 proceeds to S104. On the other hand, when the release button 19 is not half-depressed (NO side), the CPU 20 returns to the S101 to repeat the above-stated operations.

Step 104: The focus detecting section 20a of the CPU 20 performs the AF in the contrast detection system based on the data of the through image. At this time, the focus detecting section 20a sets a focus detecting area following an algorithm such as a center priority and a close priority. Besides, the focus detecting section 20a obtains the object-distance of the subject in the focus detecting area based on the position of the focusing lens at the time of focusing.

Here, when the face recognition AF is performed in the above-stated S102, the CPU 20 in the S104 stops the process of the face recognition AF by performing an AF lock in accordance with the half-depression of the release button 19.

Incidentally, the focus detecting section 20*a* in this case obtains the object-distances of the detected respective face areas.

Step 105: The CPU 20 determines whether the release button 19 is full-depressed or not. When the release button 19 is full-depressed (YES side), the CPU 20 proceeds to S107. On the other hand, when the release button 19 is not full-depressed (NO side), the CPU 20 proceeds to S106.

Step 106: The CPU 20 determines whether the half-depression of the release button 19 is released or not. When the half-depression of the release button 19 is released (YES side), the CPU 20 returns to the S101 to repeat the above-stated operations. On the other hand, when the half-depression of the release button 19 continues (NO side), the CPU 20 returns to the S105.

Step 107: The CPU 20 performs the imaging process of the main image by driving the image pickup device 13. After that, the data of the main image is generated by the image processing section 16.

Step 108: The image processing section 16 performs an edge enhancement process on the data of the main image.

Step 109: The subject extracting section 20*c* of the CPU 20 analyses the main image to divide into plural areas. Concretely speaking, when the adjacent pixels in the main image have nearly equal luminance value or hue with each other, the subject extracting section 20*c* considers these pixels as the pixels of the same subject, groups them, and divides the main image into the plural areas. Besides, the subject extracting section 20*c* may extract an edge component of the main image to divide the main image into the plural areas based on this edge.

Step 110: The CPU 20 determines whether the face area is detected by the face recognizing process in the S102 or not. When the face area is detected (YES side), the CPU 20 proceeds to S111. On the other hand, when the face area is not detected (NO side), the CPU 20 proceeds to S112.

Figure 3:
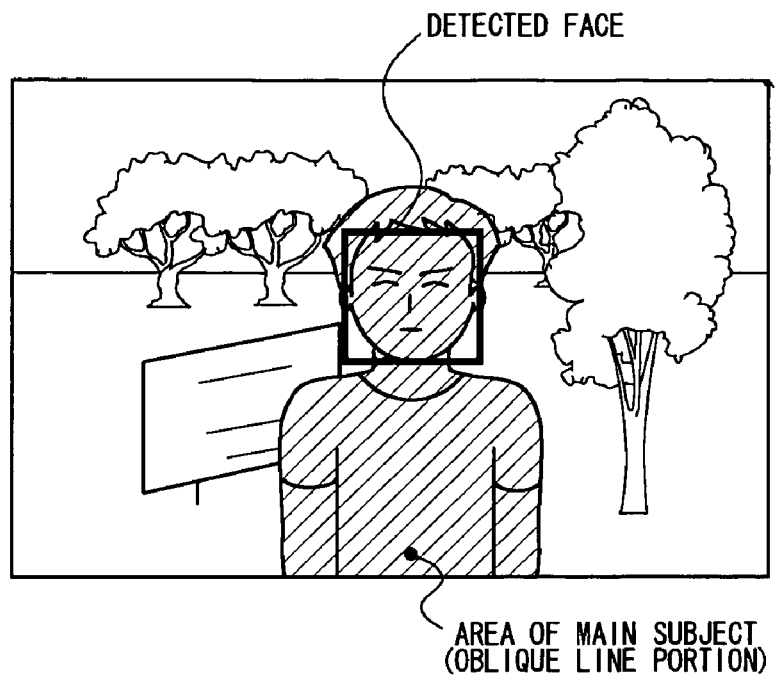
FIG. 3 is an explanatory view showing an area of a main subject in a scene with a person.

Step 111: The subject extracting section 20*c* of the CPU 20 selects the area in which the face of the person is included as the area of the main subject from among the area group divided in the S109. For example, when the face recognizing section 20*b* detects the face of the person in a scene of FIG. 3, the subject extracting section 20*c* selects the area including the face of the person as the area of the main subject. Incidentally, when plural persons are detected inside the photographing screen, the subject extracting section 20*c* can set the plural persons as the main subject.

Figure 4:
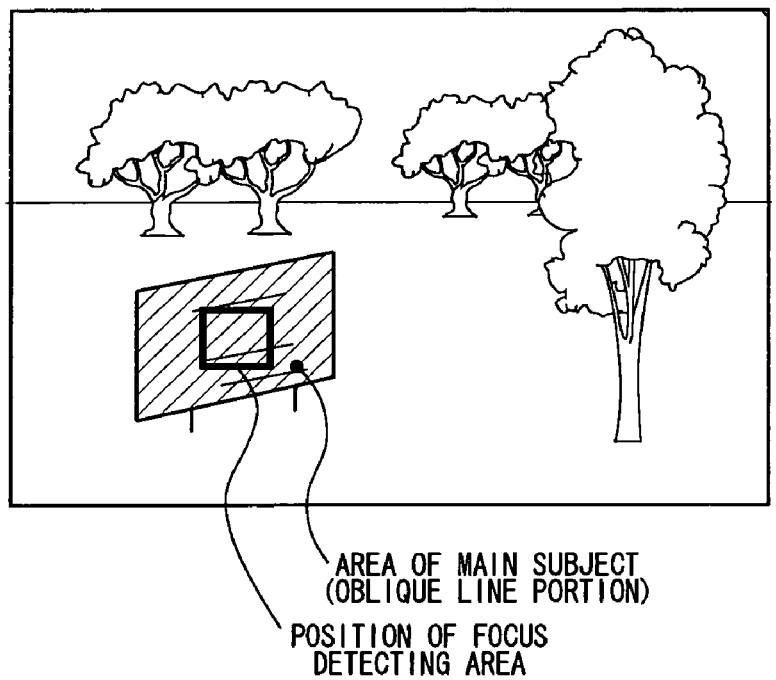
FIG. 4 is an explanatory view showing an area of a main subject in a scene without a person.

Step 112: The subject extracting section 20*c* of the CPU 20 selects the area overlapping with the position of the focus detecting area (S104) as the area of the main subject from among the area group divided in the S109. For example, when it is photographed focusing on a signboard in the drawing in a scene of FIG. 4, the subject extracting section 20*c* selects the area corresponding to the focus detecting area (signboard) as the area of the main subject.

Step 113: The CPU 20 instructs the image processing section 16 to perform the noise addition process. The image processing section 16 adds the noise with the high-frequency component to the data of the image in a random manner for the area of the main subject within the main image (S111, S112). Accordingly, the noise with high-frequency component is automatically added only to the area of the main subject of the main image.

At this time, the image processing section 16 may adjust an amplitude of the noise with the high-frequency component (a variable range of a signal level added as the noise) added to the image, in accordance with the object-distance obtained in the S104. For example, the nearer object-distance is, the larger the amplitude of the noise is set by the image processing section 16. On the other hand, the further the object-distance is, the smaller the amplitude of the noise is set. Incidentally, when the plural persons are set as the main subject, the image processing section 16 may adjust the amplitude of the noise by each face based on the respective object-distances of the face areas.

Step 114: The CPU 20 records the data of the main image after the noise addition process (S113) to the recording medium 22. That is the explanation of FIG. 2.

Hereinafter, effects of the first embodiment are described. The electronic camera of the first embodiment extracts the main subject from the main image based on the position of the focus detecting area and the face recognition result, and adds the noise with high-frequency component to the area of the main subject (S111 to S113). Consequently, according to the electronic camera of the first embodiment, it is possible to easily obtain the preferable image in which the sharpness of the main subject seems to be enhanced as human visual characteristics, by the addition of the noise with high-frequency component.

In particular, the effect of the edge enhancement becomes small when a flat subject with few edges is photographed largely. However, in the electronic camera of the first embodiment, it is possible to effectively improve the sharpness of the main subject even in the above-stated case. Besides, in the electronic camera of the first embodiment, when the edge enhancement process and the noise addition process are used at the same time, it is possible to enhance the sharpness of the image even if a degree of the edge enhancement is turned down, and therefore, it becomes possible to prevent that the edge of the image becomes unnatural by a strong edge enhancement.

Besides, the electronic camera of the first embodiment adds the noise with the high-frequency component to the area of the main subject automatically, and therefore, a labor for the user to specify the main subject one by one becomes unnecessary, and user's convenience improves largely.

Further, the electronic camera of the first embodiment adjusts the amplitude of the noise in accordance with the object-distance, and therefore, it is possible to make an appearance of the main subject more natural. Besides, in the electronic camera of the first embodiment, the noise is added to the area of the main subject after the edge enhancement process is performed in advance, and therefore, a possibility in which the noise component is amplified by the edge enhancement process is decreased.

Explanation of Second Embodiment

Figure 5:
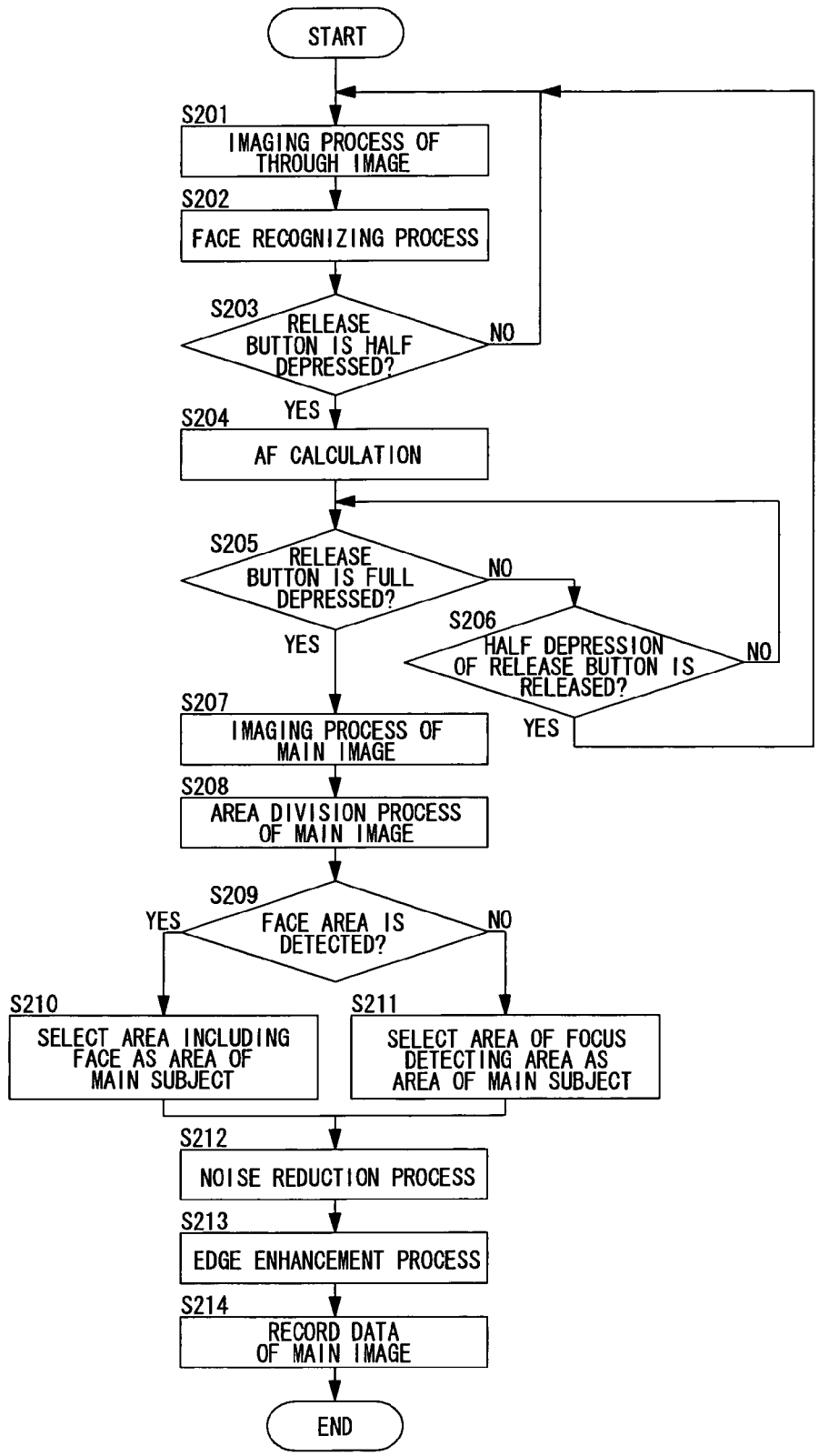
FIG. 5 is a flowchart explaining an example of photographing operations in an electronic camera of a second embodiment.

FIG. 5 is a flowchart explaining an example of photographing operations in an electronic camera of a second embodiment. Here, a configuration of the electronic camera in the second embodiment is common with the electronic camera of the first embodiment shown in FIG. 1, and therefore, the duplicated explanation is not given. Incidentally, S201 to S207 in FIG. 5 respectively correspond to the S101 to S107 in FIG. 2, and S214 in FIG. 5 corresponds to the S114 in FIG. 2, and therefore, the duplicated explanations are not given.

Step 208: The subject extracting section 20*c* of the CPU 20 analyses the main image and divides into plural areas. Incidentally, the process in the S208 is performed as same as the S109 in FIG. 2, and therefore, the duplicated explanation is not given.

Step 209: The CPU 20 determines whether the face area is detected in the face recognizing process of the S202 or not. When the face area is detected (YES side), the CPU 20 proceeds to S210. On the other hand, when the face area is not detected (NO side), the CPU 20 proceeds to S211.

Step 210: The subject extracting section 20c of the CPU 20 selects the area in which the face of the person is included as the area of the main subject within the area groups divided in the S208. Incidentally, the process in the S210 is performed as same as the S111 in FIG. 2, and therefore, the duplicated explanation is not given.

Step 211: The subject extracting section 20c of the CPU 20 selects the area overlapping with the position of the focus detecting area (S204) as the area of the main subject within the area groups divided in the S208. Incidentally, the process in the S211 is performed as same as the S12 in FIG. 2, and therefore, the duplicated explanation is not given.

Step 212: The CPU 20 instructs the image processing section 16 to perform a noise reduction process. The image processing section 16 performs a low-pass filter process, a median-filter process, and so on to a background area other than the area of the main subject (S210, S211) within the main image, and removes the noise component from the above-stated background area. Consequently, it becomes a state in which relatively more noise with high-frequency component is included in the area of the main subject of the main image compared to the background area.

Here, the image processing section 16 in the S212 may apply a filter having a weaker noise reduction effect to the area of the main subject compared to the background area, and may perform the noise reduction process also on the area of the main subject. At this time, the image processing section 16 may adjust the noise reduction effect of the filter applied to the area of the main subject in accordance with the object-distance obtained in the S204. In this case, the nearer the object-distance is, the weaker the image processing section 16 makes the noise reduction effect of the filter applied to the area of the main subject.

Step 213: The image processing section 16 performs the edge enhancement process on the data of the main image. In this S213, the image processing section 16 performs the edge enhancement after the noise reduction, and therefore, a possibility in which the noise component is amplified by the edge enhancement process is decreased. That is the explanation of FIG. 5.

Hereinafter, effects of the second embodiment are described. The electronic camera of the second embodiment extracts the main subject from the main image based on the position of the focus detecting area and the face recognition result, and the noise of the background area excluding the area of the main subject is reduced (S210 to S212). As a result, according to the electronic camera of the second embodiment, the amount of the noise component of the area of the main subject relatively increases compared to the background area, and therefore, it is possible to obtain a substantially similar effect with the first embodiment.

Supplemental Matters of Embodiment (1) The image processing section 16 in the first embodiment may decrease an amount of the noise to be added little by little as the process goes from inside to outside of the area, so that the image changes smoothly at a periphery of the edge when the noise is added to the area of the main subject.

(2) An example of the electronic camera performing the AF in the contrast detection system is described in the above-stated embodiment, but the AF of the imaging apparatus of the present invention is not limited to the above-stated embodiment. For example, the imaging apparatus of the present invention may be the one housing an AF module in a publicly known phase difference detection system, or a publicly known passive-type AF module performing a focus detection by an optical system independent from the imaging lens 11 (both are not shown).

(3) The focus detecting section 20a in the above-stated embodiment may obtain the object-distance of all areas in the photographic screen by scanning the focusing lens in a constant direction. The image processing section 16 may adjust parameters of the noise addition process and the noise reduction process independently by each area, based on the object-distance of each area. Besides, the subject extracting section 20c may treat a subject existing at a distance of the same degree as the main subject though positioning in another area from the main subject, as same as the main subject.

(4) The CPU 20 in the above-stated embodiment may change a size and so on of the amplitude of the noise by estimating the object-distance from a size of the face when the face recognition can be performed.

(5) The imaging apparatus of the present invention may extract the main subject by recognizing a subject other than the face of the person by using a pattern matching and so on. Besides, an object of the face recognition is not limited to the face of the person, but for example, a face of an animal such as a dog and a cat may be a detection object.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging apparatus, comprising:
  an imaging section capturing an object image and generating data of an image;
  a subject extracting section extracting a main subject from said image; and
  an image processing section performing a noise addition process on the data of said image to add noise for an area where said main subject is positioned within said image.

2. The imaging apparatus according to claim 1, further comprising:
  a focus detecting section detecting a focusing state in a focus detecting area set inside a photographing screen,
  wherein said subject extracting section extracts said main subject based on a position of said focus detecting area at a time of photographing.

3. The imaging apparatus according to claim 2,
  wherein said subject extracting section divides said image into plural areas, and selects the area where said main subject is positioned from among said plural areas.

4. The imaging apparatus according to claim 1,
  wherein said subject extracting section recognizes a specific subject included in said image, and extracts said main subject based on the recognition result.

5. The imaging apparatus according to claim 4,
  wherein said subject extracting section divides said image into plural areas, and selects the area where said main subject is positioned from among said plural areas.

6. The imaging apparatus according to claim 1,
  wherein said image processing section adjusts, in accordance with an object-distance, said noise left in said image.

7. The imaging apparatus according to claim 6, further comprising:
a focus detecting section calculating a focus evaluation value of said object image, and searching for a lens position where the focus evaluation value becomes a maximum value,
wherein said image processing section obtains said object-distance based on an output of said focus detecting section.

8. The imaging apparatus according to claim 1,
wherein said image processing section performs said noise addition process after an edge enhancement process is performed on the data of said image.

9. An imaging apparatus, comprising:
an imaging section capturing an object image and generating data of an image;
a subject extracting section extracting a main subject from said image; and
an image processing section performing a noise reduction process on the data of said image to reduce noise from said image, and enhancing a degree of the reduction of said noise for an area where said main subject is not included within said image compared to an area where said main subject is positioned.

10. The imaging apparatus according to claim 9, further comprising:
a focus detecting section detecting a focusing state in a focus detecting area set inside a photographing screen,
wherein said subject extracting section extracts said main subject based on a position of said focus detecting area at a time of photographing.

11. The imaging apparatus according to claim 10,
wherein said subject extracting section divides said image into plural areas, and selects the area where said main subject is positioned from among said plural areas.

12. The imaging apparatus according to claim 9,
wherein said subject extracting section recognizes a specific subject included in said image, and extracts said main subject based on the recognition result.

13. The imaging apparatus according to claim 12,
wherein said subject extracting section divides said image into plural areas, and selects the area where said main subject is positioned from among said plural areas.

14. The imaging apparatus according to claim 9,
wherein said image processing section adjusts, in accordance with an object-distance, said noise left in said image.

15. The imaging apparatus according to claim 14, further comprising:
a focus detecting section calculating a focus evaluation value of said object image, and searching for a lens position where the focus evaluation value becomes a maximum value,
wherein said image processing section obtains said object-distance based on an output of said focus detecting section.

16. The imaging apparatus according to claim 9,
wherein said image processing section performs an edge enhancement process after said noise reduction process is performed on the data of said image.

* * * * *